(12) United States Patent
Takayama

(10) Patent No.: US 6,816,815 B2
(45) Date of Patent: Nov. 9, 2004

(54) PREVENTIVE MAINTENANCE SYSTEM OF INDUSTRIAL MACHINE

(75) Inventor: Yukiyoshi Takayama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/309,955

(22) Filed: Dec. 4, 2002

(65) Prior Publication Data

US 2003/0115510 A1 Jun. 19, 2003

(30) Foreign Application Priority Data

Dec. 7, 2001 (JP) .................................. 2001-373760

(51) Int. Cl.⁷ .......................................... G06F 19/00
(52) U.S. Cl. ...................................... 702/184; 700/9
(58) Field of Search ........................... 702/184, 33, 35, 702/57–59, 180, 182, 183, 185, 187, 188; 714/1, 2, 5, 25, 48, 30, 39, 47; 700/9, 26, 28, 81, 108, 104, 117, 169, 177

(56) References Cited

U.S. PATENT DOCUMENTS

| | | | |
|---|---|---|---|
| 5,445,347 A | * | 8/1995 | Ng .......................... 246/169 R |
| 5,875,430 A | * | 2/1999 | Koether ........................ 705/1 |
| 6,317,701 B1 | * | 11/2001 | Pyotsia et al. .............. 702/188 |
| 6,496,814 B1 | * | 12/2002 | Busche ........................ 706/21 |

FOREIGN PATENT DOCUMENTS

JP    2000-210800    8/2000

* cited by examiner

Primary Examiner—Marc S. Hoff
Assistant Examiner—Edward Raymond
(74) Attorney, Agent, or Firm—Frishauf, Holtz, Goodman & Chick, P.C.

(57) ABSTRACT

A preventive maintenance system for an industrial machine includes an information transmission unit for connecting, whenever necessary, a LAN on the user side and a LAN on a manufacturer side through a communication line; a monitor unit connected to the LAN on the user side for monitoring predetermined items of the industrial machine; an information transmission/reception unit for transmitting the monitor information obtained by the monitor unit to the LAN on the manufacturer side through the information transmission unit, and for receiving information from the LAN on the manufacturer side; a supervisory unit connected to the LAN on the manufacturer side for automatically diagnosing a fault based on the monitor information received, and for automatically supervising the industrial machine; and a preventive maintenance information transmission unit for automatically transmitting preventive maintenance information to the user side when maintenance is necessary based on a diagnosis result.

16 Claims, 6 Drawing Sheets

PREVENTIVE MAINTENANCE SYSTEM OF INDUSTRIAL MACHINE

BACKGROUND OF THE INVENTION

1. Field of the Invention

This invention relates to a preventive maintenance system of industrial machines such as press machines and machine tools. More particularly, the invention relates to a preventive maintenance system of industrial machines suitable for preventive maintenance that is to be conducted before any disorder occurs.

2. Description of the Related Art

So-called "mechatronic" technologies have made remarkable progress in recent years to improve performance and the man-machine interface in industrial machines such as press machines and machine tools. However, since recent industrial machines contain a number of technical portions classified as black-box technologies, and since know-how and experience are often required for preventive maintenance, service engineers on the user side sometimes fail to cope with disorders. When a disorder develops in the industrial machine, therefore, a quick maintenance assistance system on the side of the manufacturer has become indispensable. Particularly, a system that correctly grasps the condition of a machine from a remote place and enables the manufacturer to conduct appropriate preventive maintenance has been strongly required.

To build up such a preventive maintenance system, a diagnostic technology for executing fault diagnosis on the basis of signals during operation of an industrial machine has been proposed in the past, and JP-A-2000-210800, for example, describes a monitor apparatus for an industrial machine. FIG. 6 of the accompanying drawings provides an overview of the system of the monitor apparatus described in this prior art reference. This technology will be hereinafter explained with reference to FIG. 6. A large transfer press (hereinafter called merely the "press") is installed in each of a plurality of production lines set up in each plant A, B and C. Each press includes a press main body for conducting press molding at a plurality of working stations and a work conveyor for conveying works among a plurality of working stations. A press control sequencer (press controller) controls the start and stop of the press. As a motion controller controls each servomotor through each servo driver, the position of the work conveyor and its speed are controlled.

One server terminal for diagnosis is provided to each plant A, B and C. The press controller, the motion control and a line production management computer are connected as clients to the server terminal through, for example, an Ethernet (TRADEMARK). Information from each line is externally distributed (to the manufacturer of the press 51) through the server terminal. In addition, the manufacturer can gain access to the clients such as the pressure controller through the server terminal. Here, the line production management computer of each line is a terminal for collecting real-time data such as oscillation of the press and its current condition. This terminal has a board to which an analog input card for inputting later-appearing analog information and an Ethernet (TRADEMARK) (not shown) card for the connection with the server terminal can be fitted. The server terminal can be connected to a diagnosis terminal with a modem installed on the manufacturer side through a telephone line.

In the system described above, a dial-up connection is established through the telephone line from the diagnosis terminal installed on the manufacturer side or from the line production management computer of each plant A, B and C to the server terminal of the plant A, B and C to be monitored to log in to the client such as the press controller. The signal waveform to be monitored is acquired from each sensor through the analog input card and the waveform data so acquired is distributed to the diagnosis terminal or to the line production management computer of each plant A, B and C that, requests monitoring. In addition, the diagnosis terminal or the line production management computer of each line has several software packages for fault diagnosis. An oscilloscope, for example, may display waveform data distributed as a waveform on a terminal display screen. An on-line manual function has the functions of preserving the waveform of a normal operation of a machine measured in the past, reading out the preserved waveform, comparing it with the present waveform and stipulating a maintenance position from the change of the waveform.

The monitor method through fault diagnosis described in JP-A-2000-210800 described above compares an actual measurement value of an analog waveform (such as a motor current and a pressure value) with a normal value and judges whether or not any disorder occurs on the basis of the comparison result. However, the contents and causes of the fault are diversified and moreover, a plurality of causes are associated with one another in complicated ways. For this reason, diagnosis cannot always be made correctly by the comparison of only one kind of waveform data. As a matter of fact, comparative examination by using one kind of waveform data can seldom judge correctly the true cause of the disorder. It has been found from this aspect, too, that expert knowledge, experience and know-how of service engineers and expert engineers on the manufacturer side are indispensable for fault diagnosis.

On the other hand, the manufacturer cannot keep a large number of service engineers and expert engineers for fault diagnosis from the aspect of cost. Otherwise, the maintenance fee to the user will rise. Therefore, it is not practically advantageous to wholly conduct the actual maintenance work on the manufacturer side. Further, it is often impossible for the service engineer on the manufacturer side to finish repairs within a short time because it takes time for the service engineer to visit the user. Therefore, the service engineer on the user side can preferably conduct the maintenance work to a certain extent.

SUMMARY OF THE INVENTION

With the background described above, it is an object of the invention to provide a preventive maintenance system for an industrial machine that enables a service engineer on a user side to efficiently conduct maintenance work while a manufacturer provides expert maintenance information.

According to a first aspect of the invention for accomplishing the object described above, there is provided a preventive maintenance system of an industrial machine for preserving industrial machines installed in a plant on a user side by repairing or preventing a disorder, comprising an information transmission unit for connecting, whenever necessary, a LAN on the user side and a LAN on a manufacturer side through a wire and/or wireless communication line; a monitor unit connected to the LAN on the user side for monitoring an operation condition of an industrial machine with respect to predetermined items; an information transmission/reception unit connected to the LAN on the user side for transmitting either constantly or periodically monitor information obtained by the monitor unit to the LAN on the manufacturer side through the information transmission unit, and for receiving information from the LAN on the manufacturer side through the information transmission unit; a supervisory unit connected to the LAN on the manufacturer side for receiving the monitor information transmitted from the information transmission/reception unit, for automatically diagnosing a fault on the basis of the monitor information, and for automatically supervising the industrial machine; and a preventive maintenance information transmission unit for automatically transmitting preventive maintenance information to the information transmission/reception unit on the user side through the information transmission unit when maintenance is necessary such as when any disorder occurs, on the basis of a diagnosis result of the supervisory unit.

In the construction described above, the monitor unit monitors the operation condition of the industrial machine installed in the user's plant, and the monitor information is transmitted from the LAN on the user side to the supervisory unit of the LAN on the manufacturer side through the communication line. The supervisory unit automatically executes fault diagnosis on the basis of this monitor information. When maintenance is judged as necessary on the basis of the diagnosis result such as when the industrial machine is judged as being out of order, the maintenance information for releasing the disorder is automatically transmitted to the information transmission/reception unit on the user side through the communication line. In consequence, the service engineer on the user side can easily and reliably correct the disorder in accordance with this maintenance information. It is therefore not necessary for the service engineer and the expert on the manufacturer side to visit the site, and the user can conduct efficiently and economically the maintenance work within a short time such as correcting and repairing the disorder.

The preventive maintenance system of the industrial machine may have a construction in which the monitor information acquired by the monitor unit can be analyzed by people, whenever necessary.

According to the constructions described above, the monitor information can be analyzed while the service engineer and the expert engineer on the manufacturer side intervene. Therefore, it becomes possible to effectively utilize the expert technologies, experience and know-how of the service engineer and the expert engineer with the result of automatic analysis (fault diagnosis). Reliability of the result of fault diagnosis can thus be improved.

In the preventive maintenance system of the industrial machine described above, the monitor items to be conducted for the industrial machine and the content of preventive maintenance may be determined by a contract between the manufacturer and the user.

According to the construction described above, the monitor items and the content of preventive maintenance are determined by the condition of the preventive maintenance contract with the user. The manufacturer provides services such as collection of monitor information, its analysis (fault diagnosis) and maintenance information, and can provide optimum services at an optimum cost within the range the user desires.

The monitor items of the industrial machine may be at least one of production management information, operation information, operation condition shift, error values, fault history information and maintenance history information.

According to the construction described above, the monitor items of the industrial machine are at least one of production management information, operation information, operation condition shift, error values, fault history information and maintenance history information. Since analysis can be conducted on the basis of diversified information, accuracy of fault diagnosis and component life estimation can be improved.

In the preventive maintenance system of the industrial machine, the information transmission unit may have a construction such that it automatically retrieves the same or analogous condition of a disorder when any disorder occurs in the industrial machine, and automatically displays a solution on a monitor device on the user side.

According to the construction described above, the condition that is the same as, or analogous to, the present disorder is automatically retrieved from among the monitor information built up in the past at the time of the occurrence of the disorder, and a cause of the present disorder and its solution are automatically displayed on the monitor device on the user side on the basis of the corresponding condition. Therefore, it becomes possible to effectively utilize the past record information, to improve accuracy of fault diagnosis and component life estimation, and to conduct effective preventive maintenance.

In the preventive maintenance system of the industrial machine, the information transmission/reception unit is so constituted as to automatically display component exchange information of the industrial machine and/or prior exchange timing information of life components and consumed components on the monitor device on the user side.

According to such a construction, the work procedure for exchanging the defective (abnormal) component, the component exchange information such as the exchange manual and the drawing and/or the prior exchange timing information of the life components and the consumed components are automatically displayed on the monitor device on the user side. Therefore, the service engineer on the user side can carry out the component exchange work easily, reliably and moreover systematically. In this way, maintenance on the user side becomes possible.

The preventive maintenance system of the industrial machine may have a construction such that when any emergency occurs on the user side, an optimum maintenance center on the manufacturer side is automatically selected depending on the time zone and/or the geographic condition, and the communication line between the user and the maintenance center is connected.

According to such a construction, when any emergency (emergency at night, for example) occurs on the user side, the optimum maintenance center of the manufacturer, that is, the maintenance center that can provide the services described above at the time of occurrence of emergency and is moreover closest to the user's plant, is automatically selected depending on the time zone and/or the geographic condition, and the LAN on the user side and the LAN of the selected maintenance center can be connected through the communication line. Therefore, the manufacturer can offer the services for 24 hours and 365 days, and the user can reliably make the contract with the manufacturer.

In the preventive maintenance system of the industrial machine, when any emergency occurs on the user side, an optimum service engineer on the manufacturer side is automatically selected depending on the content of disorder, and the communication line between the user and the service engineer can be connected.

According to such a construction, when any emergency occurs on the user side, the optimum service engineer on the manufacturer side is automatically selected depending on the content of the disorder, and the LAN on the user side and the LAN of the maintenance center to which the optimum service engineer belongs can be connected through the communication line. Therefore, fault diagnosis can be made reliably and within a short time, and the user can reliably make the contract with the manufacturer.

Further, the communication line may have a construction such that bi-directional information can be exchanged among a plurality of nodes, and image data, sound information and character information that are shared can be transmitted.

According to the construction described above, a real-time conference can be held between the service engineer on the user side and the service engineers and expert engineers of a plurality of maintenance centers on the manufacturer side through bi-directional communication, and the image data, the sound information and the character information that are shared are exchanged to conduct technical consultation to acquire an easy and efficient measure against the disorder. Since the information can be smoothly and reliably transmitted between both parties, the instruction of the work content to the service engineer on the user side and the result report from the service engineer on the user side can be made without error.

DESCRIPTION OF THE PREFERRED EMBODIMENTS

A preferred embodiment of the invention will be explained hereinafter in detail with reference to FIGS. 1 to 5.

Figure 1:
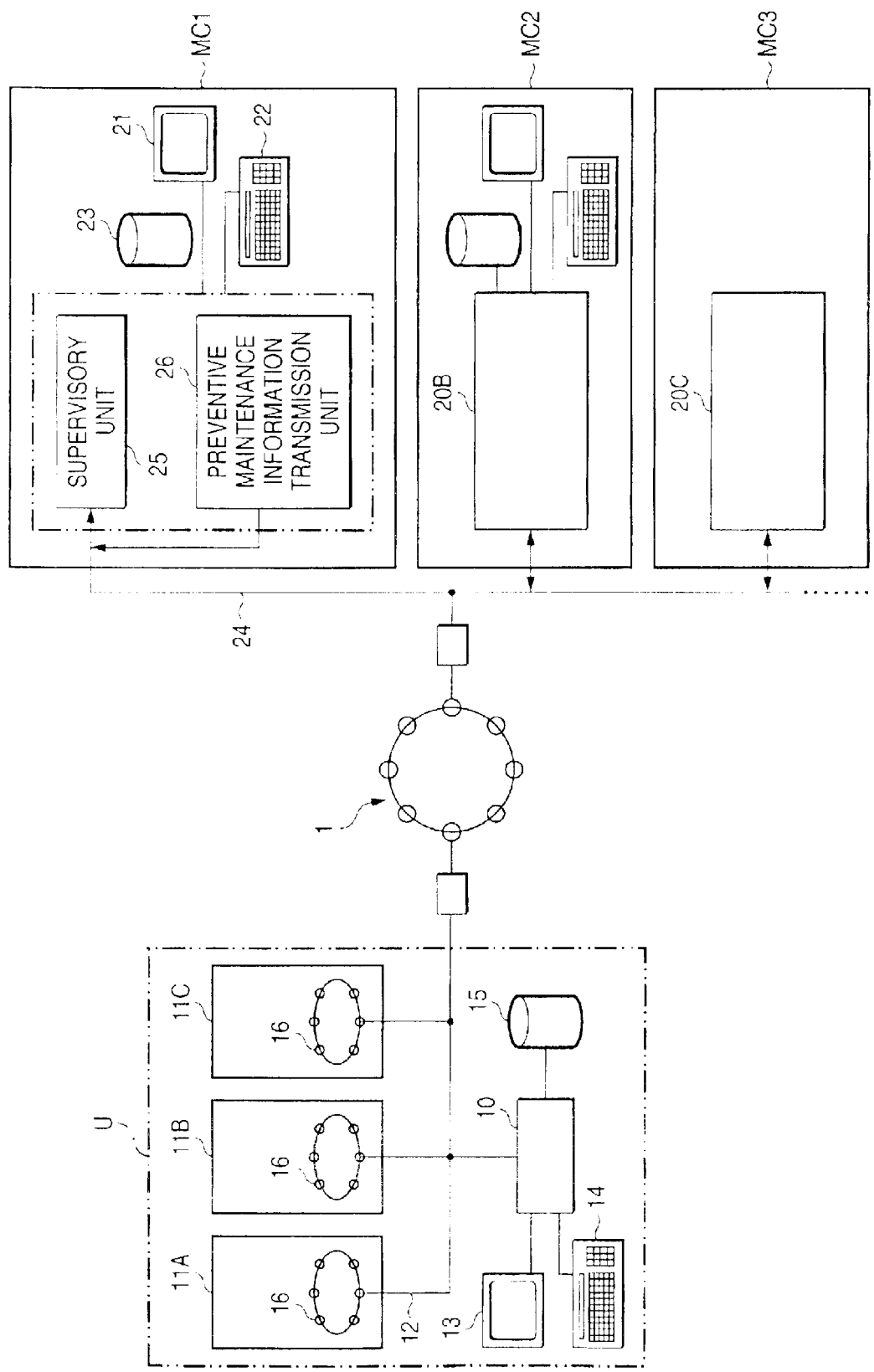
FIG. 1 is a structural view of a preventive maintenance system of an industrial machine according to the invention.

FIG. 1 is a structural view of a preventive maintenance system of an industrial machine according to the invention. A production plant of each user U has a plurality of production lines 11A, 11B and 11C each having industrial machines such as press machines typified by a transfer press, work conveying machines, thin plate working machines and machine tools. A controller 16 for the press machine, for the work conveying machine and for the machine tool of each production line 11A, 11B, 11C is connected to an LAN inside each production line. The LAN inside each production line is connected to a computer (hereinafter called "CPU") 10 as a server terminal on the user side through an inter-plant LAN 12 of the user. A monitor device 13 for displaying various kinds of monitor information and messages, a keyboard 14 for outputting various instruction signals and operation signals through an operation made by an operator and a storage device 15 having a predetermined capacity, for storing in time series various kinds of monitor information are connected to each CPU 10.

Each user and a manufacturer make a preventive maintenance contract for each industrial machine. This contract includes a fault repair contract (contract for an abnormal situation) for repairing when any fault occurs and a preventive maintenance contract (contract for normal situation) for periodically conducting a fault diagnosis to estimate the occurrence of the disorder, exchanging those components for which the occurrence of the disorder is estimated, those components whose expected life is to run out and consumed components, to conduct preventive maintenance besides repairing of faults. The preventive maintenance contract is classified into several ranks in accordance with the items of preventive maintenance and the content and term of contract for every contracted machine, and the user pays compensation in accordance with each rank. Therefore, the controller 16 of each industrial machine as the object of the contract has a monitor unit such as sensors, devices and software of the items to be monitored that correspond to the content of the contract.

On the other hand, the manufacturer sets up a plurality of maintenance centers MC1, MC2 and MC3 in each predetermined area. Computers for maintenance monitoring (hereinafter called "CPU") 20A, 20B and 20C are respectively installed as the server terminal in these maintenance centers MC1, MC2 and MC3 and are connected to one another, constituting an LAN 24 on the manufacture side. The inter-plant LAN 12 of each user U and the LAN 24 of the manufacturer are connected through a communication line 1 such as the Internet or a satellite communication line.

Each CPU 20A, 20B is equipped with a supervisory unit 25 and a preventive maintenance information transmission unit 26. A monitor device 21, a keyboard 22 and a storage device 23 having a predetermined capacity are connected to each CPU. The supervisory unit 25 automatically analyzes monitor information of each industrial machine, conducts fault diagnosis and supervises the industrial machine. The preventive maintenance information transmission unit 26 transmits information necessary for preventive maintenance (hereinafter called "maintenance information") to the monitor device 13 through the communication line 1 and through each CPU 10 on the basis of the fault diagnosis result of the supervisory unit 25 when the disorder is judged as existing or when the occurrence of the disorder is estimated.

The controller 16 of each industrial machine collects and stores in a predetermined cycle the monitor items corresponding to the preventive maintenance contract ranks. The data so collected are periodically stored in the memory device 15 through the inter-plant LAN 12 and through the CPU 10 on the user side U.

The monitor items include the following items, for example.
a) operation condition of industrial machine:
   operation condition signals such as current value of each electric servo motor, position information, speed information, detection pressure value of each oil pressure sensor, press load value, control timing signal, etc.
b) shift of operation condition:
   shift of operation condition with time.
c) error value:
   position error value at the time of servo control of electric servo motor, speed error value, etc.
d) fault history:
   each data such as error code previously occurred, error content, disorder content, occurrence time, repair finish time, fault repair content, etc.
e) maintenance history:
   periodical inspection content and execution time, consumed and life components exchanged, exchange time, etc.

f) production management information:
   total operation time, number of total strokes (number of slide working), etc.

The CPU 20A, 20B inside each maintenance center MC1, MC2 acquires, either periodically or whenever any disorder occurs, the detection data of the monitor items described above from the storage device 15 of the CPU 10 on the user side U through the communication line 1 in accordance with the preventive maintenance contract rank (content) for every machine, and stores them in the storage device 23 of each CPU 20A, 20B. A fault diagnosis software is loaded to each CPU 20A, 20B. This fault diagnosis software executes a fault diagnosis processing on the basis of the monitor item data stored in the storage device 23 and displays the result of diagnosis on the monitor device 13 through the communication line 1 and through the CPU 10 on the user side U.

Figure 2:
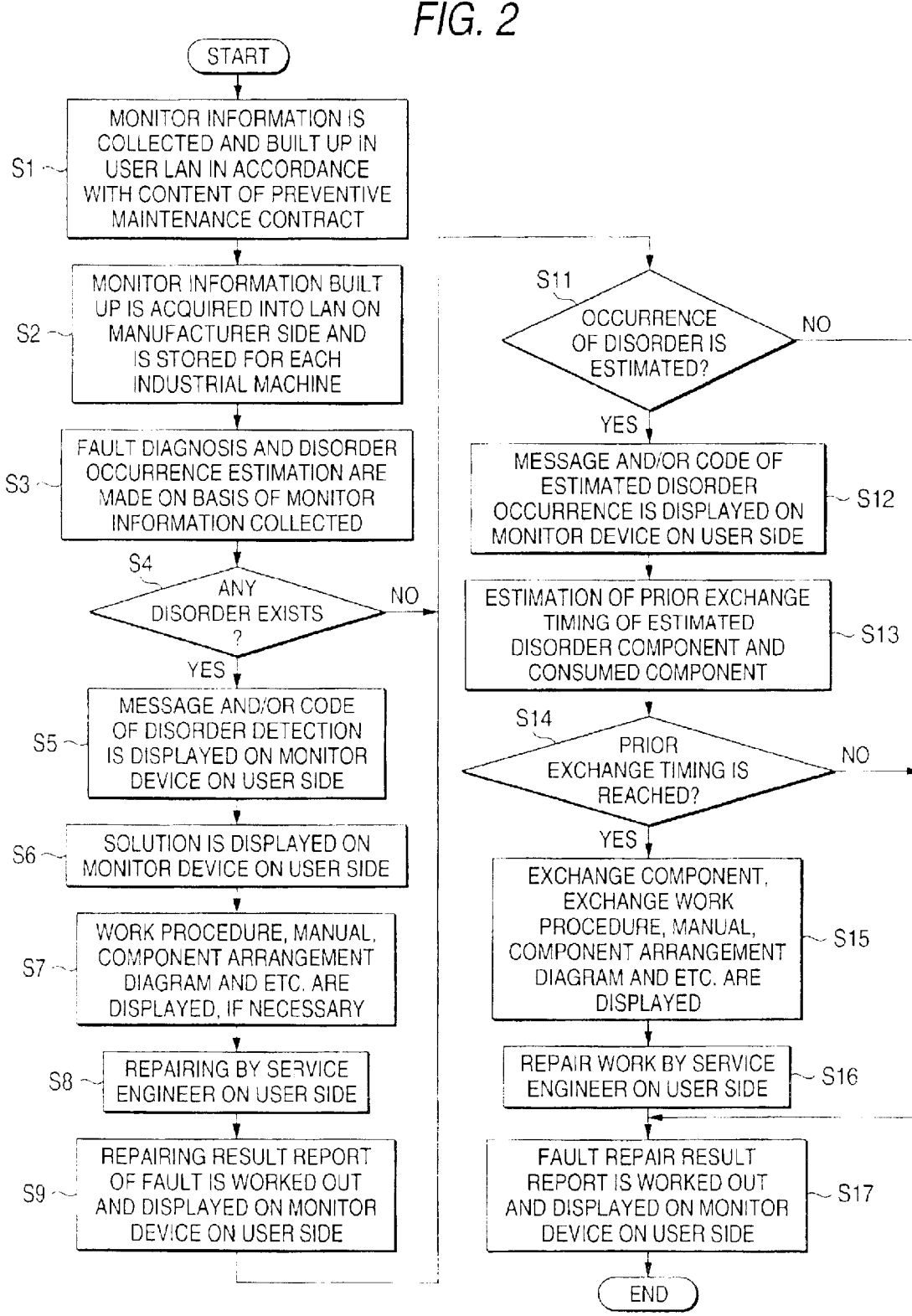
FIG. 2 is a flowchart for executing preventive maintenance.

Next, the sequence of preventive maintenance according to the invention will be explained with reference to FIG. 2. FIG. 2 is a flowchart for executing preventive maintenance.

In Step S1, the controller 16 of the industrial machine collects the items to be monitored in accordance with the content of the preventive maintenance contract. The data so collected are periodically stored in the storage device 15 through the inter-plant LAN 12 and the CPU 10 on the user side U. In Step S2, the CPU 20A, 20B of each maintenance center MC1, MC2 of the maintenance center of the manufacturer in charge of the location of each user plant reads the monitor information of each industrial machine from the storage device 15 on the user side U through the communication line 1 and stores it in the memory device 23. In Step S3, fault diagnosis is executed on the basis of the monitor information so stored within the condition of the preventive maintenance contract of this industrial machine. Further, fault diagnosis is made for the components falling within the preventive maintenance contract condition (as to whether or not the fault occurs) and fault estimation (life estimation as to whether or not components having high possibility of fault exist) is also made on the basis of the monitor information built up in the past. In Step S4, judgment is made as to whether or not any fault exists, that is, whether or not the components and phenomena judged as abnormal occur. The processing shifts to Step S5 when any fault exists, and to Step S11 when no fault exists.

In Step S5, an error message and/or an error code representing detection of the abnormal condition is transmitted and displayed to and on the monitor device 13 of the inter-plant LAN 12 on the user side U through the communication line 1. In Step S6, a solution (release) measure of the abnormal condition detected as described above is transmitted and displayed to and on the monitor device 13 on the user side U whenever the user requests. Here, the solution (release) measure of the abnormal condition includes an operation sequence for releasing the disorder, a sequence for temporarily releasing the disorder to consecutively operate the industrial machine, and arrangement diagrams and circuit diagrams of components and devices necessary for the releasing operation. In Step S7, exchange manuals for exchanging the components and circuit diagrams necessary for confirming the operation after the exchange are transmitted and displayed to and on the monitor device 13, whenever necessary. In Step S8, a service engineer on the user side U releases the abnormal condition while referring to the operation procedures, the component arrangement diagrams, the circuit diagrams, the exchange manuals, and so forth, displayed on the monitor device 13. In Step S9, the service engineer works out a fault repairing result report and transmits and displays the report to and on the monitor device 13. The flow then shifts to Step S11.

In Step S11, whether or not those components in which the occurrence of disorder is estimated, those components whose life is expected to run out and those consumed components that must be periodically exchanged exist is judged. If they do, in Step S12, an error message and/or an error code representing the existence of the disorder estimated components, the life components and the consumed components is transmitted and displayed to and on the monitor device 13. In Step S13, prior exchange timing of these disorder estimated components, life components and consumed components is estimated, and the estimation result is transmitted and displayed to and on the monitor device 13. Incidentally, judgment of the existence/absence of the disorder estimated components, the life components and the consumed components covers a predetermined span of time from the present moment. Next, in Step S14, whether or not the estimated prior exchange timing is reached is checked at the present moment. If it is, in Step S15, the components to be exchanged, the exchange procedure, the exchange manuals and the arrangement diagrams and the circuit diagrams of the exchange components are transmitted and displayed to and on the monitor device 13. In Step S16, the service engineer on the user side U exchanges these components for preventive maintenance while referring to the exchange procedures, the exchange manuals, the component arrangement diagrams and the circuit diagrams displayed on the monitor device 13. In Step S17, the service engineer works out the report of the result of the fault diagnosis, the estimation result and the maintenance work result, transmits and displays the report to and on the display device 13 and finishes this processing.

When the estimated prior exchange timing is not reached in Step S14, the processing of Step S17 described above is executed. When the components for which the occurrence of any disorder is estimated, the components that are expected to reach service life and the consumed components that are to be periodically exchanged do not exist in Step S11, the processing of S17 is similarly executed.

The preventive maintenance method described above provides the following effects.

(1) The operation condition of the industrial machines installed in the user plant is monitored and the monitor information is transmitted and stored to and in the CPU 20 on the manufacturer side through the communication line. The CPU 20 on the manufacturer side automatically executes fault diagnosis on the basis of this monitor information. When any disorder is judged as existing in the industrial machines on the basis of the result of this diagnosis, the preventive maintenance information for correcting the disorder (work procedure, component exchange procedure, exchange manual, component arrangement diagram, circuit diagram, etc) is automatically transmitted to the CPU 10 on the user side and is displayed on the monitor device 13. Therefore, the service engineer on the user side can easily and reliably correct the disorder in accordance with this preventive maintenance information. Consequently, it is not necessary for the service engineer and the expert engineer on the manufacturer side to pay a visit to the site. Instead, the user side can efficiently and economically correct the disorder and repair the fault within a short time.

(2) The monitor items of the industrial machines include production management information, operation information, operation condition shift, error values, fault history information and maintenance history information. The fault can be analyzed on the basis of a variety of information that has been built up in the past. Therefore, accuracy of fault diagnosis and component life estimation can be improved.

(3) The monitor items and the content of preventive maintenance are determined under the condition of the preventive maintenance contract with the user, and collection of monitor information, analysis (fault diagnosis) and preventive maintenance information are offered in accordance with the content of the contract. Therefore, it is possible to provide an optimum service at an optimum cost within the range the user desires.

(4) The component exchange information such as the work procedure for exchanging defective components and disorder components, the exchange manuals, the component arrangement diagrams and the circuit diagrams is automatically displayed on the monitor device on the user side. Therefore, the service engineer of the user can easily and reliably conduct the component exchange work. Since the prior exchange timing information of the life components and the consumed components is automatically displayed on the monitor device on the user side, the user can systematically make a prior exchange plan of these components and can therefore conduct the maintenance work.

Next, the preventive maintenance method according to the fault preventive maintenance contract will be explained with reference to FIGS. 3 and 4. The preventive maintenance system of industrial machine according to the invention can conduct both human fault diagnosis and automatic fault diagnosis as will be described next.

Figure 3:
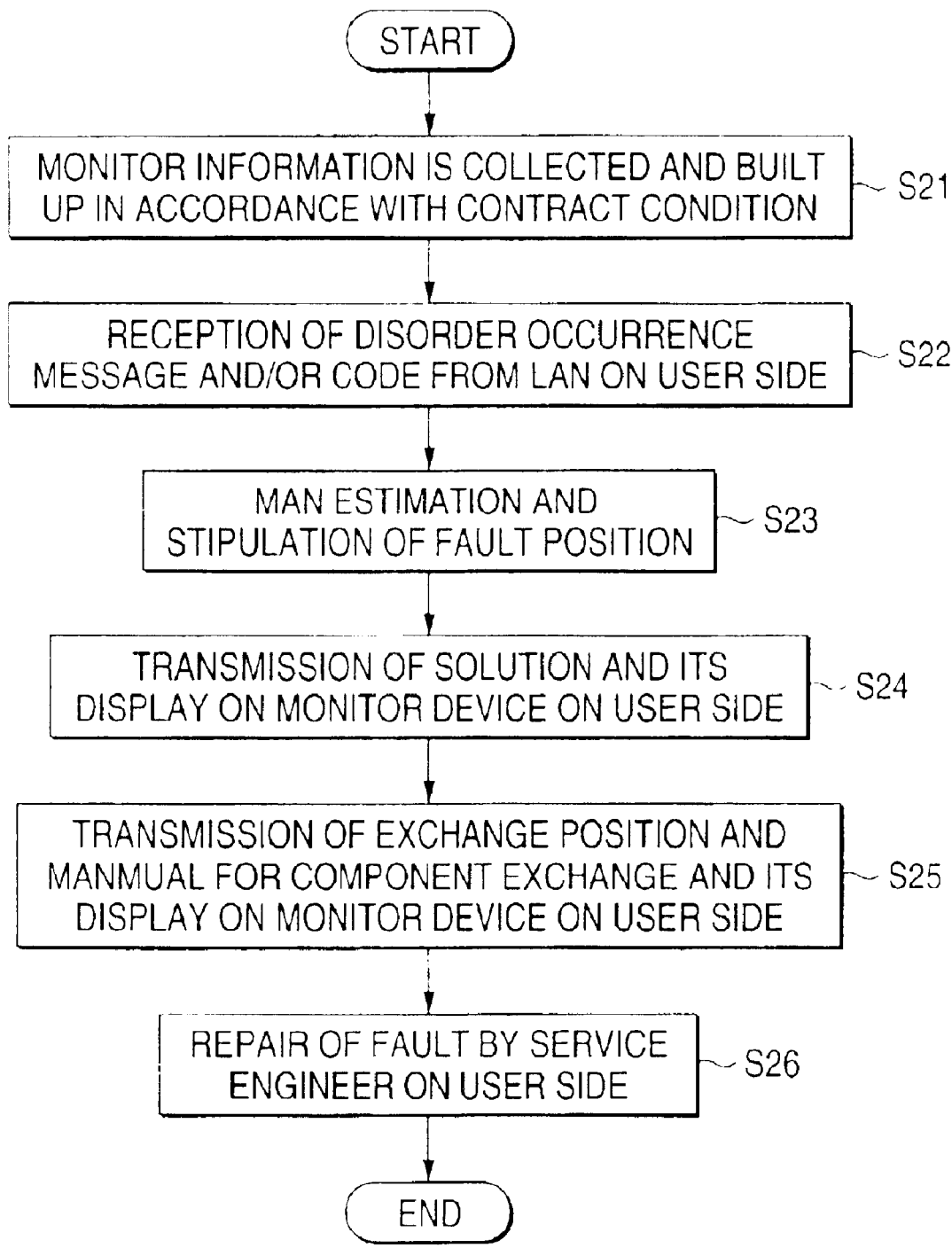
FIG. 3 is a flowchart of first preventive maintenance of a fault.

A first preventive maintenance method will be explained with reference to FIG. 3 showing a flowchart of first fault preventive maintenance.

In Step S21, the controller 16 of each industrial machine collects, in a predetermined cycle, information of each monitor item in accordance with the condition of the preventive maintenance contract. The information so collected is stored and built up in the storage device 15 through the inter-plant LAN 12 and the CPU 10 on the user side U. In next Step S22, detecting any disorder, the controller 16 of each industrial machine transmits the message and/or code representing the occurrence of the disorder to the CPU 20 on the manufacturer side through the CPU 10 and the communication line 1. In Step S23, the CPU 20 on the manufacturer side acquires the monitor information stored in the storage device 15 on the user side U through the CPU 10 and the communication line 1, and stores it in the storage device 23. The service engineer or the expert engineer on the manufacturer side displays the accumulated monitor information stored in the storage device 23 on the monitor device 21 through the operation of the keyboard 22, whenever necessary, compares and looks up the monitor information so displayed, and estimates and stipulates the cause of the occurring disorder, the defective component and the fault position on the basis of his expert technology, experience and know-how. In Step S24, the service engineer or the expert engineer of the manufacturer transmits and displays the work procedure, the component arrangement diagram, the circuit diagram, etc, for releasing the disorder as a solution to and on the monitor device 13 on the user side U on the basis of the estimation and stipulation result. If necessary, the service engineer or the expert engineer transmits and displays the name of the exchange component, the component arrangement diagram, the component exchange procedure, the exchange manual and the circuit diagram to and on the monitor device 13 in Step S25. In Step S26, the service engineer on the user side U exchanges the component and repairs the fault on the basis of the information displayed on the monitor device 13.

Figure 4:
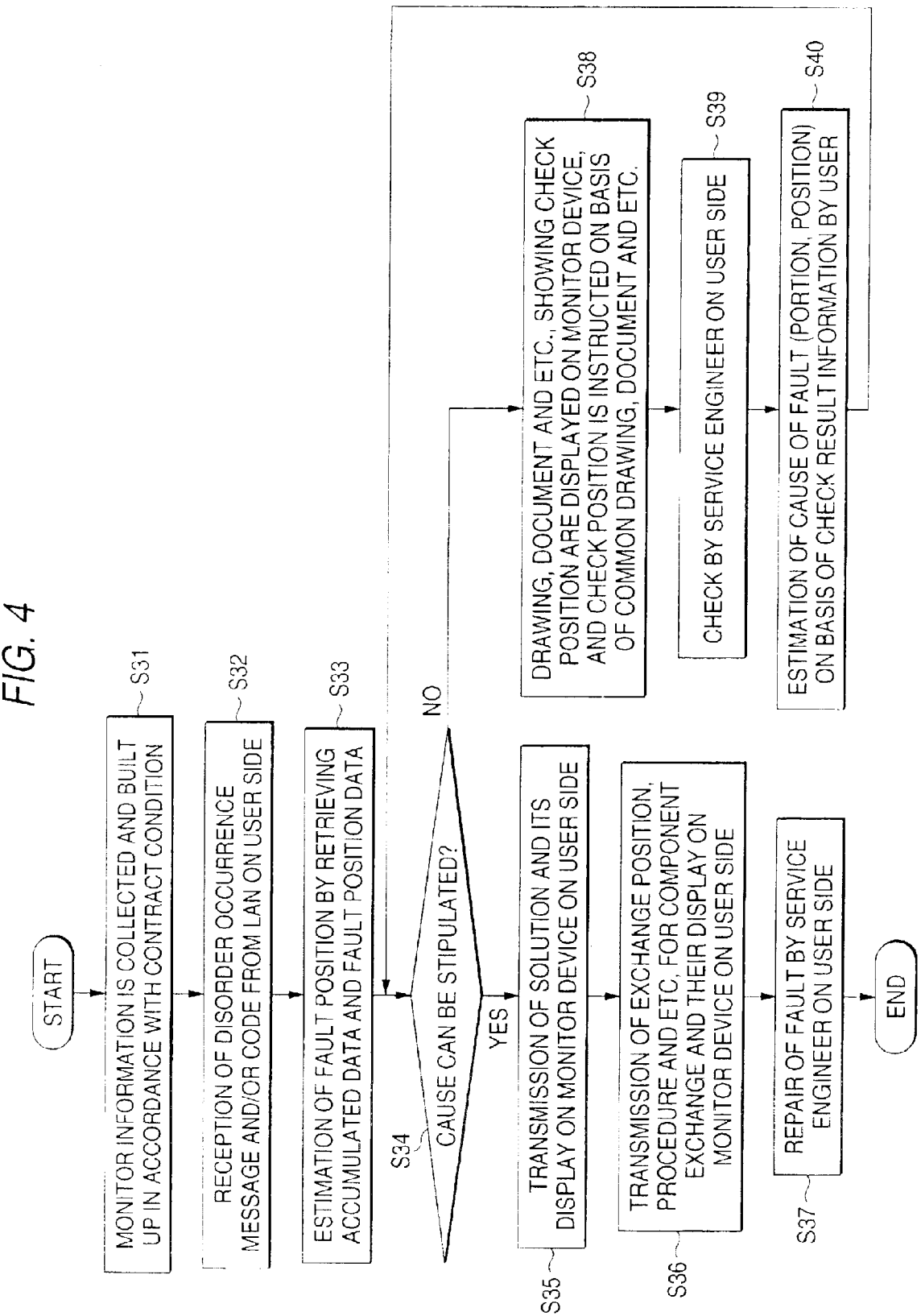
FIG. 4 is a flowchart of second preventive maintenance of a fault.

Next, a second preventive maintenance method will be explained with reference to FIG. 4 showing a flowchart of second fault preventive maintenance.

In Step S31, the controller 16 of each industrial machine collects, in a predetermined cycle, information of each monitor item in accordance with the condition of the preventive maintenance contract. The information so collected is stored and built up in the storage device 15 through the inter-plant LAN 12 and the CPU 10 on the user side U. In Step S32, detecting any disorder, the controller 16 of each industrial machine transmits the message and/or the code representing the occurrence of disorder to the CPU 20 on the manufacturer side through the CPU 10 and the communication line 1. In Step S33, the CPU 20 on the manufacturer side acquires the monitor information stored in the storage device 15 on the user side U through the CPU 10 and the communication line 1, looks up the operation condition, the operation condition shift, the error value, the fault history, etc, in this monitor information, finds out the past information that is the same or similar to the present abnormal condition, and estimates the cause of the present disorder, the fault component and the fault position on the basis of the condition so found out and the cause of the disorder. In Step S34, whether or not the cause can be stipulated is judged. When it can, in Step S35, the work procedure, the component arrangement diagram, the circuit diagram, etc, for correcting the disorder are transmitted and displayed as a solution to and on the monitor device 13 on the user side U. If necessary, the name of the exchange component, the component arrangement diagram, the component exchange procedure, the exchange manual and the circuit diagram are transmitted and displayed to and on the monitor device 13 in Step S36. In next Step S37, the service engineer on the user side U exchanges the component and repairs the fault on the basis of the information displayed on the monitor device 13, and finishes this processing.

When the cause cannot be stipulated in Step S34 described above, the component arrangement diagram and the circuit diagram representing the positions to be checked, or the check procedure document and the manual are transmitted and displayed to and on the monitor device 13 on the user side U in Step S38. Under this condition, the service engineer on the manufacturer side gives the detailed instruction of the positions to be checked to the service engineer on the user side U while they simultaneously watch the same drawings and the same documents. In Step S39, the service engineer on the user side U checks in detail in accordance with the instruction, inputs the result through the keyboard 14 to display it on the monitor device 21 on the manufacturer side and stores it in the storage device 23. In Step S40, the cause for the fault is again estimated in the same way as in Step S33 on the basis of the new information of the check result on the user side. The flow then returns to Step S34 and the processing described above is repeated.

Since the fault maintenance is conducted in the manner described above, the following effects can be acquired.

Since the service engineer and the expert engineer on the manufacturer side can simultaneously analyze the information monitored, it is possible to effectively utilize the expert technology, experiences and know-how of the service engineer and expert engineer besides the automatic analysis (fault diagnosis) by the computer. Therefore, reliability of the fault diagnosis result can be further improved.

The condition that is the same as, or analogous to, the present disorder condition is automatically retrieved from among the monitor information built up in the past and the cause of the present disorder and the disorder component are estimated and stipulated on the basis of the most corresponding condition. Therefore, accuracy of the fault diagnosis can be improved and preventive maintenance can be conducted by effectively utilizing the past monitor information providing the good results.

The solution for the disorder such as the method for correcting the cause of the disorder so stipulated, its procedures, etc, is automatically displayed on the monitor device on the user side. Therefore, the service engineer on the user side can conduct the maintenance work easily and reliably in accordance with the display content.

Incidentally, the method of estimating the cause of the present disorder on the basis of the monitor information built up in the past is not particularly limited to the method described above. It is believed effective to employ an estimation method by fuzzy reasoning and an estimation method by an expert system.

Figure 5:
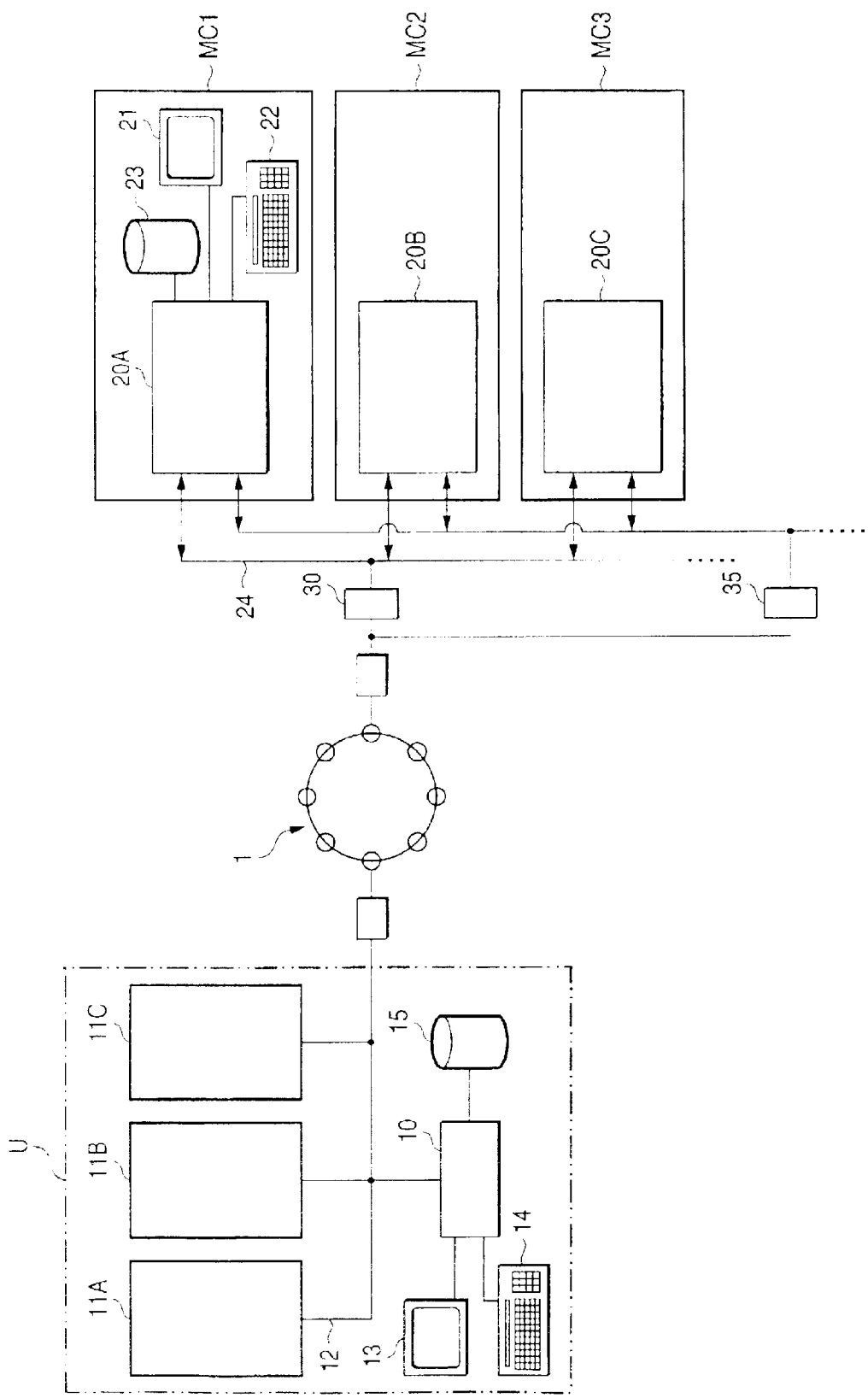
FIG. 5 is a schematic view showing another structural example of a preventive maintenance system.
Figure 6:
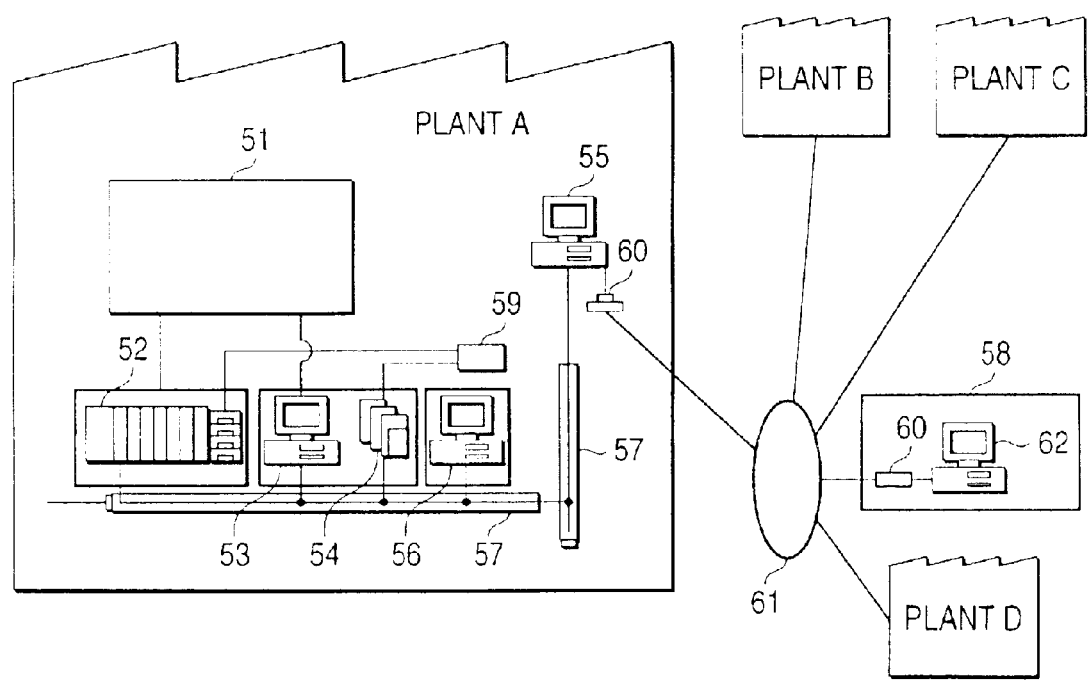
FIG. 6 is a structural view of a preventive maintenance system according to the prior art technology.

Next, FIG. 5 shows another structural example of the preventive maintenance system. The preventive maintenance system having the construction shown in FIG. 5 is easier for the user to utilize. Like reference numerals are used in this drawing to identify like constituent members in FIG. 1, and explanation of such members will be omitted.

Referring to FIG. 5, the LAN on the manufacturer side is connected to the communication line 1 through a timesharing management apparatus (hereinafter called "TS management apparatus") 30. The LAN on the manufacturer side is connected to CPUs 20A, 20B of a plurality of maintenance centers MC1 and MC2 that bear the functions both area-wise and corresponding time-wise. When a global commercial activity is taken into account, the term "area" of "areawise" hereby represents the three areas of Japan, the U.S.A and Europe. In a smaller area, the term represents a narrower area within these three areas. The term "corresponding time" of "corresponding time-wise" represents the time zone in which each maintenance center can attend to the service request from the user. The corresponding time zone may be set to three kinds of from 8:00 to 16:00, from 16:00 to 24:00 and from 00:00 to 8:00, or two kinds of from 8:00 to 20:00 and from 20:00 to 8:00, for example.

The TS management apparatus 30 manages the flow of the communication data so that it can automatically select the optimum maintenance center for the user in accordance with the area and with the corresponding time zone in response to the service request from the user, and can connect the user to the selected maintenance center through the communication line 1. Communication of the information between user side equipment such as the CPU 10, the monitor device 13 and the storage device 15 and maintenance center equipment on the manufacturer side equipment such as the CPU 20, the monitor device 21 and the storage device 23 is conducted through this TS management apparatus 30 in the same way as described above.

The TS management apparatus 30 may employ the construction in which an optimum engineer on the manufacturer side well versed in the solution method of the disorder is automatically selected in accordance with the content of the disorder in response to the service request from the user, and the LAN on the user side is connected to the LAN of the maintenance center to which the optimum engineer belongs, through the communication line. In consequence, the fault diagnosis can be reliably made within a short time, and the service engineer on the user side is able to easily correct the disorder.

If necessary, the CPU 10 on the user side U and the CPUs 20A, 20B of a plurality of maintenance centers MC1, MC2 on the manufacturer side may be connected through a preventive maintenance conference system 35 capable of bi-directional data communication. This bi-directional data communication makes it possible to execute bi-directional communication of image data, sound information or character information on the real time basis, and is constituted by utilizing a telephone line, for example. Drawings, documents, instruction items, communication items, etc, are exchanged among the service engineer and the expert engineer of each maintenance center MC1, MC2 and the service engineer on the user side through the preventive maintenance conference system. Furthermore, consultation and instruction of the work content by voice and writing and confirmation can be smoothly exchanged on the real time basis.

As described above, the TS management apparatus 30 automatically selects the optimum service center for the user in accordance with the location of the user and the time zone requested by the user in response to the service request from the user, and connects the user and the selected maintenance center through the communication line 1. It is therefore possible to constitute a service support system capable of coping with the service request from the user 24 hours a day and 365 days per year. Because the user can in turn cope with the emergency (the occurrence of disorder at night, for example), the user can reliably exchange the preventive maintenance contact.

The preventive maintenance conference can be held on the real time basis through bi-directional communication between the service engineer on the user side and the service engineer and the expert engineer of a plurality of maintenance centers on the manufacturer side. Because the engineers on both sides can easily instruct and confirm the maintenance work while looking into the drawings and the document they share, or confirming instruction items and communication items consultation for the maintenance work can be carried out efficiently. Because information can be smoothly and reliably transmitted between both sides, the instruction of the content of the maintenance work and the report of the result to and from the service engineer on the user side can be made without error. Consequently, even when the user strongly desires to emergently release the disorder even temporarily, to operate the industrial machine and to continue the production, the detailed work instruction can be given without error and the maintenance work can be reliably conducted when the service engineer of the user side tries to cope with the disorder by changing a ladder program of the controller (programmable controller) of the industrial machine in accordance with the instruction of the service engineer and the expert engineer on the manufacturer side.

As explained above, the invention can provide the following advantages.

The preventive maintenance contract of industrial machine is exchanged between the user and the manufacturer. The monitor items of the operation condition of the industrial machine are decided in accordance with the rank (content) of this maintenance contract. The supervisory unit connected to the LAN on the manufacturer side acquires and supervises the monitor information through the communication line, and executes automatic fault diagnosis or human diagnosis (while the service engineer or the expert engineer on the manufacturer side intervenes). The preventive maintenance information is transmitted to the user on the basis of the result of this diagnosis. Therefore, the service engineer on the user side can easily and reliably carry out maintenance in accordance with this maintenance information, the optimum service can be offered to the user at the optimum cost within the range the user desires, and the user side can economically conduct the maintenance work.

The monitor items described above are at least one of the production management information, the operation information, the operation condition shift, the error value, the fault history information and the maintenance history information. Therefore, the disorder can be analyzed on the basis of various information, and accuracy of fault diagnosis and component life estimation can be improved.

When any disorder occurs, the condition the same as, or analogous to, the present disorder is automatically retrieved from among the monitor information that has been built up in the past, and the cause of the present disorder and its solution are automatically displayed on the monitor device on the user side on the basis of the corresponding condition. It is thus possible to effectively utilize the past maintenance information and to improve accuracy of fault diagnosis and component life estimation.

Component exchange information such as the work procedure for exchanging the disorder component, the exchange manual and the drawings and/or prior exchange timing information of the life components and the consumed components is displayed on the monitor device on the user side. Therefore, the service engineer on the user side can carry out the component exchange work easily, reliably and moreover, systematically. In consequence, maintenance on the user side becomes possible.

When any disorder occurs on the user side, the optimum service center on the manufacturer side is automatically selected depending on the time zone and/or the geographical condition, and the LAN of the selected maintenance center can be connected to the LAN on the user side through the communication line. Therefore, the manufacturer can offer the service assistance for 24 hours and 365 days. When any disorder occurs on the user side, the optimum engineer on the manufacturer side is automatically selected depending on the content of the disorder, and the LAN of the maintenance center to which this engineer belongs can be connected to the LAN on the user side through the communication line. Fault diagnosis can be therefore conducted reliably and within a short time, and the user can reliably make the preventive maintenance contract.

Furthermore, when any disorder occurs on the user side, the service engineer on the user side and the service engineers and the expert engineers of a plurality of maintenance centers on the manufacturer side can have a real-time conference through bi-directional communication. Therefore, the service engineer on the user side can acquire consultation for an easy and efficient measure against the disorder while looking up the image data, sound information and character information they share through communication. In this way, the information can be smoothly and reliably exchanged between both parties, and the instruction of the maintenance work content to the service engineer on the user side and the result report from the service engineer can be made without error.

I claim:

1. A preventive maintenance system for an industrial machine, comprising:
    a plurality of maintenance centers on a manufacturer side and each in a predetermined area and including at least one computer for maintenance monitoring;
    a LAN on the manufacturer side connecting said maintenance monitoring computers in said plurality of maintenance centers;
    an information transmission unit for connecting a LAN on a user side and said LAN on the manufacturer side through at least one of a wired and wireless communication line;
    a monitor unit connected to said LAN on the user side for monitoring an operation condition of said industrial machine with respect to predetermined items;
    an information transmission/reception unit connected to said LAN on the user side for transmitting monitor information obtained by said monitor unit to said LAN on the manufacturer side through said information transmission unit, and for receiving information from said LAN on the manufacturer side through said information transmission unit;
    each of said maintenance monitoring computers including a supervisory unit connected to said LAN on the manufacturer side for receiving said monitor information transmitted from said information transmission/reception unit and for automatically diagnosing a fault based on said monitor information and automatically supervising said industrial machine; and
    a preventive maintenance information transmission unit for automatically transmitting preventive maintenance information to said information transmission/reception unit on the user side through said information transmission unit when maintenance is determined to be necessary based on a diagnosis result of said supervisory unit.

2. A preventive maintenance system for an industrial machine as defined in claim 1, wherein the supervisory unit includes means for determining whether the monitor information obtained by said monitor unit should be analyzed by a human.

3. A preventive maintenance system for an industrial machine as defined in claim 1, wherein the predetermined items and a content of preventive maintenance executed for said industrial machine are determined by a contract between said manufacturer and said user.

4. A preventive maintenance system for an industrial machine as defined in claim 3, wherein the predetermined items include at least one of production management information, operation information, operation condition shift, an error value, fault history information and maintenance history information.

5. A preventive maintenance system for an industrial machine as defined in claim 1, wherein said preventive maintenance information transmission unit automatically retrieves one of a same and analogous condition of a disorder condition when any disorder occurs in said industrial machine, and automatically displays a solution on a monitor device on the user side.

6. A preventive maintenance system for an industrial machine as defined in claim 1, wherein said preventive maintenance information transmission unit automatically displays at least one of component exchange information of said industrial machine and prior exchange timing information of life components and consumed components on a monitor device on the user side.

7. A preventive maintenance system for an industrial machine as defined in claim 1, wherein the supervisory unit includes means for automatically selecting an optimum one of said maintenance centers on the manufacturer side depending on at least one of a time zone and a geographical condition, and connects said user to said maintenance center through the communication line when any emergency occurs on the user side.

8. A preventive maintenance system for an industrial machine as defined in claim 1, wherein the supervisory unit includes means for automatically selecting an optimum service engineer on the manufacturer side depending on a content of a disorder between the user, and wherein the service engineer can be connected to said user via the communication line when any emergency occurs on the user side.

9. A preventive maintenance system for an industrial machine as defined in claim 7, wherein said communication line can execute bi-directional information transmission among a plurality of nodes, and can transmit image data, sound information and character information to be shared.

10. A preventive maintenance system for an industrial machine as defined in claim 8, wherein said communication line can execute bi-directional information transmission among a plurality of nodes, and can transmit image data, sound information and character information to be shared.

11. A preventive maintenance system for an industrial machine, comprising:

an information transmission unit for connecting a LAN on a user side and a LAN on a manufacturer side through at least one of a wired and wireless communication line;

a monitor unit connected to said LAN on the user side for monitoring an operation condition of said industrial machine with respect to predetermined items;

an information transmission/reception unit connected to said LAN on the user side for transmitting monitor information obtained by said monitor unit to said LAN on the manufacturer side through said information transmission unit, and for receiving information from said LAN on the manufacturer side through said information transmission unit;

a supervisory unit connected to said LAN on the manufacturer side for receiving said monitor information transmitted from said information transmission/reception unit and for automatically diagnosing a fault based on said monitor information and automatically supervising said industrial machine; and a preventive maintenance information transmission unit for automatically transmitting preventive maintenance information to said information transmission/reception unit on the user side through said information transmission unit when maintenance is determined to be necessary based on a diagnosis result of said supervisory unit, said preventive maintenance information transmission unit automatically retrieving one of a same and analogous condition of a disorder condition when any disorder occurs in said industrial machine, and automatically displaying a solution on a monitor device on the user side.

12. A preventive maintenance system for an industrial machine, comprising:

an information transmission unit for connecting a LAN on a user side and a LAN on a manufacturer side through at least one of a wired and wireless communication line;

a monitor unit connected to said LAN on the user side for monitoring an operation condition of said industrial machine with respect to predetermined items;

an information transmission/reception unit connected to said LAN on the user side for transmitting monitor information obtained by said monitor unit to said LAN on the manufacturer side through said information transmission unit, and for receiving information from said LAN on the manufacturer side through said information transmission unit;

a supervisory unit connected to said LAN on the manufacturer side for receiving said monitor information transmitted from said information transmission/reception unit and for automatically diagnosing a fault based on said monitor information and automatically supervising said industrial machine; and a preventive maintenance information transmission unit for automatically transmitting preventive maintenance information to said information transmission/reception unit on the user side through said information transmission unit when maintenance is determined to be necessary based on a diagnosis result of said supervisory unit, said preventive maintenance information transmission unit automatically displaying at least one of component exchange information of said industrial machine and prior exchange timing information of life components and consumed components on a monitor device on the user side.

13. A preventive maintenance system for an industrial machine, comprising:

an information transmission unit for connecting a LAN on a user side and a LAN on a manufacturer side through at least one of a wired and wireless communication line;

a monitor unit connected to said LAN on the user side for monitoring an operation condition of said industrial machine with respect to predetermined items;

an information transmission/reception unit connected to said LAN on the user side for transmitting monitor information obtained by said monitor unit to said LAN on the manufacturer side through said information transmission unit, and for receiving information from said LAN on the manufacturer side through said information transmission unit;

a supervisory unit connected to said LAN on the manufacturer side for receiving said monitor information transmitted from said information transmission/reception unit and for automatically diagnosing a fault based on said monitor information and automatically supervising said industrial machine; and a preventive maintenance information transmission unit for automatically transmitting preventive maintenance information to said information transmission/reception unit on the user side through said information transmission unit when maintenance is determined to be necessary based on a diagnosis result of said supervisory unit, the supervisory unit including means for automatically selecting an optimum maintenance center on the manufacturer side depending on at least one of a time zone and a geographical condition, and connects said user to said maintenance center through the communication line when any emergency occurs on the user side.

14. A preventive maintenance system for an industrial machine as defined in claim 13, wherein said communication line can execute bi-directional information transmission among a plurality of nodes, and can transmit image data, sound information and character information to be shared.

15. A preventive maintenance system for an industrial machine, comprising:

an information transmission unit for connecting a LAN on a user side and a LAN on a manufacturer side through at least one of a wired and wireless communication line;

a monitor unit connected to said LAN on the user side for monitoring an operation condition of said industrial machine with respect to predetermined items;

an information transmission/reception unit connected to said LAN on the user side for transmitting monitor information obtained by said monitor unit to said LAN on the manufacturer side through said information transmission unit, and for receiving information from said LAN on the manufacturer side through said information transmission unit;

a supervisory unit connected to said LAN on the manufacturer side for receiving said monitor information transmitted from said information transmission/reception unit and for automatically diagnosing a fault based on said monitor information and automatically supervising said industrial machine; and a preventive maintenance information transmission unit for automatically transmitting preventive maintenance information to said information transmission/reception unit on the user side through said information transmission unit when maintenance is determined to be necessary based on a diagnosis result of said supervisory unit, the supervisory unit including means for automatically selecting an optimum service engineer on the manufacturer side depending on a content of a disorder between the user, and wherein the service engineer can be connected to said user via the communication line when any emergency occurs on the user side.

16. A preventive maintenance system for an industrial machine as defined in claim 15, wherein said communication line can execute bi-directional information transmission among a plurality of nodes, and can transmit image data, sound information and character information to be shared.

* * * * *